Sept. 15, 1931.   S. A. BARONE   1,823,851
METHOD OF GENERATING THREE-PHASE HIGH FREQUENCY CURRENT
Filed Feb. 17, 1926
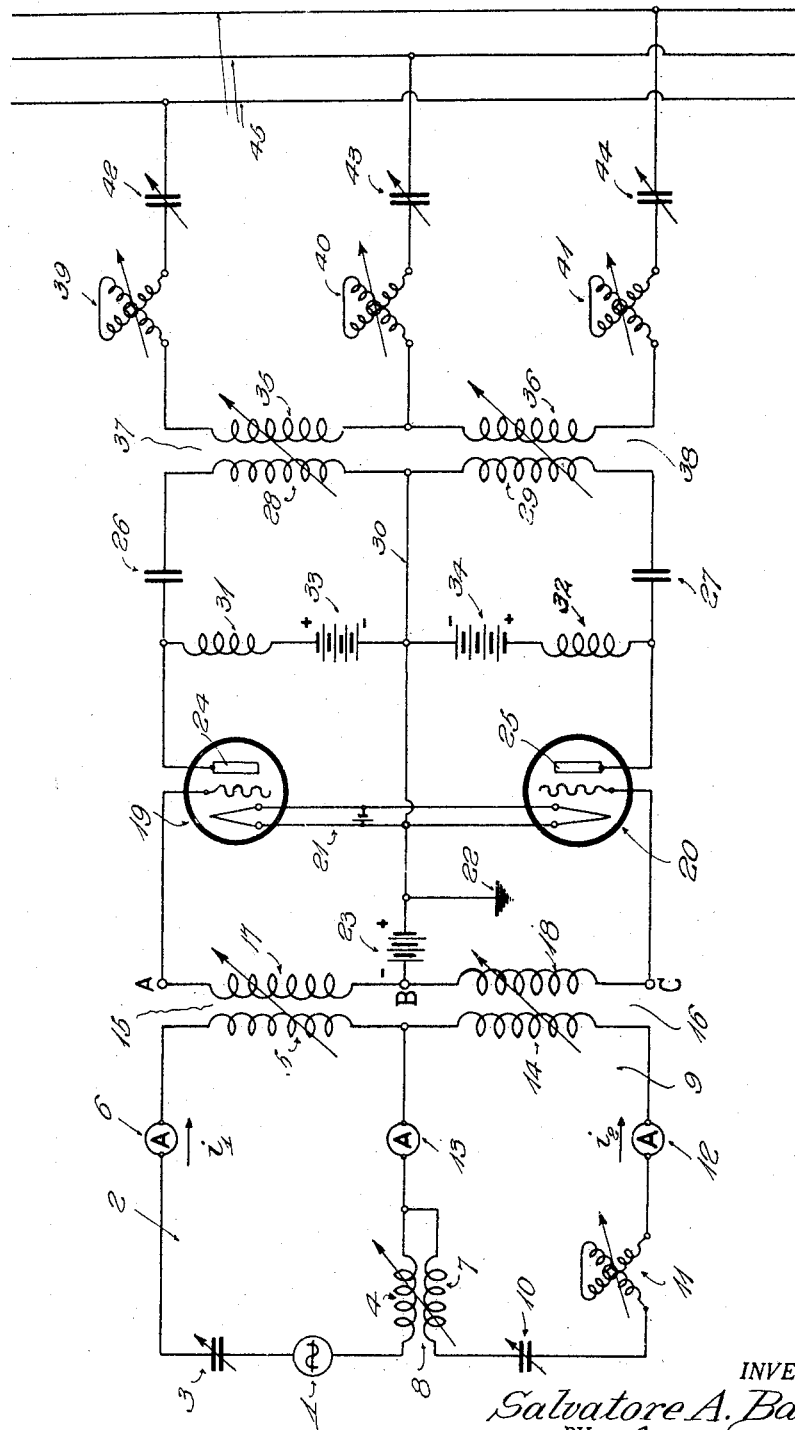
INVENTOR.
Salvatore A. Barone,
BY John B. Brody
ATTORNEY Patented Sept. 15, 1931

1,823,851

UNITED STATES PATENT OFFICE

SALVATORE A. BARONE, OF WOODSIDE, NEW YORK, ASSIGNOR, BY MESNE ASSIGNMENTS, TO FEDERAL TELEGRAPH COMPANY, OF SAN FRANCISCO, CALIFORNIA, A CORPORATION OF CALIFORNIA

METHOD OF GENERATING THREE PHASE HIGH FREQUENCY CURRENT

Application filed February 17, 1926. Serial No. 88,839.

My invention relates broadly to a method of generating high frequency current and more particularly to a method of developing three phase high frequency current from a single phase high frequency current.

One of the objects of my invention is to provide a system for the generation of three phase high frequency current from a single phase source of high frequency current wherein means are provided for developing currents having relatively small phase displacement and then shifting the effects of this phase displacement to a larger value for the production of three phase high frequency current.

Another object of my invention is to provide a method of generating three phase high frequency current from a single phase source where currents differing in time phase are derived from the source and then displaced in phase for the production of a three phase high frequency current.

Still another object of my invention is to provide an apparatus by which three phase high frequency current may be produced from a single high phase high frequency current source where circuits are provided for obtaining two currents from the single phase source differing in time phase by less than 90° and with open delta connected transformers forming a coupling system between the single phase source and a three phase high frequency load for shifting the effects of this phase displacement to an angle between 90 and 180 degrees.

A further object of my invention is to provide a double electron tube power amplifier system having input and output circuits, a source of single phase high frequency current for exciting the input circuits of the double tube amplifier system with a three phase load connected with the output circuits of the double tube amplifier system with means interposed in the circuits for first displacing currents from said source by a relatively small angle and then shifting the phase displacement of these currents over a larger angle for the production of three phase high frequency current.

A still further object of my invention is to provide a circuit arrangement for the generation of three phase high frequency current in which a balanced double electron tube power amplifier is provided having input and output circuits with open delta connected input and output transformers therein, with a source of single phase high frequency current connected with the input transformers and a three phase load connected with the output transformers and arranged whereby currents from said single phase source are first displaced by a relatively small angle and then the phase displacement shifted to 120° for delivering three phase high frequency current to the three phase load.

My invention will be more fully understood from the specification hereinafter following and by reference to the accompanying drawing, wherein my invention has been diagrammatically set forth showing the impression of a single phase high frequency current upon the apparatus and the delivery of three phase high frequency current to a three phase load.

Referring to the drawing in detail, reference character 1 represents a source of single phase high frequency current, which may be modulated or unmodulated. Source 1 operates into circuit 2 composed of series connected variable capacity 3, primary inductance 4 of transformer 8, primary inductance 5 of transformer 15, and ammeters 6 and 13. Inductively coupled to inductance 4 through secondary inductance 7 is circuit 9, composed of variable capacity 10, variable inductance 11, primary inductance 14 of transformer 16, and ammeters 12 and 13. Ammeter 13 is common to both circuits 2 and 9. Inductively coupled to inductances 5 and 14 are, respectively, secondary inductances 17 and 18. These latter are themselves connected in series, their free terminals connecting with the grids of electron tubes 19, 20, and their common terminal connected to the common filament terminal 21 through biasing battery 23. Common connection 21 is also shown grounded at 22. No coupling is assumed to exist between the paired inductances 5—14 and 17—18. Plates 24, 25, of electron tubes 19, 20, are interconnected through capacities 26, 27, and primary inductances 28, 29. The junction point of inductances 28, 29, is connected to common filament connection 21 through connection 30. Plates 24 and 25, respectively, receive their high continuous voltages from source 33 and 34 here shown to be batteries, through high frequency choke coils 31, 32. Coils 31 and 32 in combination with capacities 26 and 27 function to establish definite paths for the continuous and alternating components of the plate current. Inductively coupled to output inductances 28, 29, are respectively secondary inductances 35 and 36 which are connected in series in open delta. In series with the free terminals of inductances 35, 36, and connected with their common junction are, respectively, variable inductances 39, 41, 40, variable capacities 42, 44, 43, and leads connecting with the three conductors of a three phase electric power transmission system, here represented as transmission lines 45. No coupling is assumed to exist between the paired inductances 28—29 and 35—36.

In carrying out my invention several conditions present themselves. With reference to the accompanying drawing, the currents $i_1$ and $i_2$ in circuits 2 and 9, respectively, may be adjusted by manipulation of the variable condenser 10, variable inductance 11 and transformer 8 so that they differ in time phase relation by either 60° or 120°. In either case the adjustments are such that the currents $i_1$ and $i_2$ are substantially equal as indicated on ammeters 6 and 12, respectively. I prefer to operate the system of my invention with the 60° phase relation because, for this condition, the reading of ammeter 13 will be the same as the reading of either ammeter 6 or 12, that is, the three ammeters, 6, 12 and 13 will read alike.

If the phase relation between currents $i_1$ and $i_2$ is adjusted to 120°, the reading of ammeter 13 will be 1.732 times the reading of either ammeter 6 or 12. Under this condition the effects of currents $i_1$ and $i_2$ on the ammeter 13 are additive so the resultant, as indicated on ammeter 13, is equal to the $$\sqrt{3} \text{ times either } i_1 \text{ or } i_2.$$

If the inductance pairs 5—17 and 14—18 are connected in the same sense, as shown in the drawing, and the currents $i_1$ and $i_2$ are adjusted for 60° phase relation, the voltages impressed on the grids of vacuum tubes 19 and 20 will be in 60° phase relation. However, if I desire to obtain 120° phase relation between the voltages impressed on the grids of the vacuum tubes 19 and 20, I reverse the connections of one of the inductances 5, 17, 14 or 18. Similarly, in the output circuits of vacuum tubes 19 and 20, the inductance pairs 28—35 and 29—36 are shown connected in the same sense but I may reverse the connections of one of these inductances and thereby change the phase relationship of the currents in the connections to the transmission lines 45, from 60° to 120°; assuming that the change was not already made on the input side of vacuum tubes 19 and 20.

In the actual operation of the system of my invention I prefer to use the 60° phase relation between the currents in circuits 2 and 9 as the equality in the indications of ammeters 6, 12 and 13 has a practical operating advantage. With the transformers 15, 16, 37 and 38 properly connected to change this phase relation from 60° in circuits 2 and 9 to 120° in the connections to the transmission lines, the equality of the readings of ammeters 6, 12 and 13 gives assurance that the proper phase relations are being maintained in the system.

While I have described my invention in a certain preferred embodiment, I desire that it be understood that modifications may be made without departing from the spirit of my invention. Furthermore, it should be understood that my invention is limited only by the scope of the appended claims.

What I claim and desire to secure by Letters Patent of the United States is as follows:

1. A system for generating three phase high frequency current comprising in combination a source of single phase high frequency current, a three phase load, a balanced electron tube amplification system constituted by two electron tubes having input and output circuits, sets of open delta connected transformers arranged in said input and output circuits, a circuit interconnecting said source and the open delta connected transformers in said input circuits for deriving currents displaced in phase substantially 60°, said open delta connected transformers in said input circuits providing means for developing three voltages displaced in phase by substantially 120°, and connections between the open delta connected transformers in said output circuits and said three phase load for delivering three phase high frequency current to said load.

2. A system for generating three phase high frequency current comprising in combination a source of single phase high frequency current, a three phase load circuit, a balanced electron tube amplification circuit including a pair of electron tubes having input and output circuits, independent open delta connected transformers included in each of said input and output circuits, connections between said source and the open delta connected transformers in said input circuits for deriving currents substantially differing in time phase from said source, and connections between the open delta connected transformers in said output circuit and said three phase load for shifting the phase of the derived currents and impressing three phase high frequency currents derived from said aforementioned currents upon said three phase high frequency load.

3. A system for generating three phase high frequency current comprising in combination a source of single phase high frequency current, a three phase load circuit, a balanced electron tube amplification circuit including a pair of interconnected electron tubes having input and output circuits, open delta connected transformers connected in each of said input and output circuits, electrical connections between said source of high frequency current and the open delta connected transformers in said input circuits, means included in said connections for obtaining two currents from said source differing in time phase by less than 90 degrees, and connections between the open delta connected transformers in said output circuits and said three phase load circuits, said open delta connected transformers operating to shift the effects of the phase displacement of the currents derived from said source to an angle between 90 and 180 degrees.

4. A system for generating three phase high frequency current comprising in combination a source of single phase high frequency current, phase displacing circuits connected with said source for obtaining two currents differing in time phase by less than 90 degrees, a balanced double electron tube power amplifier, and open delta connected input and output transformers connected with said amplifier, said transformers operating to shift the phase of said currents to a 120 degree relationship.

5. A transmission system comprising in combination with a three phase transmission line, a source of single phase high frequency current, a circuit for obtaining two currents differing in time phase by less than 90 degrees, a balanced electron tube amplification system, a pair of independent input and output circuits connected with said amplification system, open delta connected transformers coupling said source with the input circuits of said amplification system, and separate open delta connected transformers coupling the output circuits of said amplification system with said three phase transmission line, said open delta connected transformers operating to shift the phase of the derived current and generate three currents displaced in phase by 120 degrees.

6. A system for generating three phase high frequency current comprising in combination a source of single phase high frequency current, a balanced electron tube amplifier comprising a pair of electron tubes, independent inductances associated with the input circuits of each of said electron tubes, and a phase altering circuit associated with said source of high frequency current for developing two independent currents displaced in phase by at least 60°, said phase altering circuit having a main circuit and a branch circuit with independent inductance units in said main circuit and said branch circuit coupled independently to said inductances associated with the electron tube input circuits for impressing upon said electron tube input circuits three phase voltages.

SALVATORE A. BARONE.